United States Patent [19]

Dougherty

[11] Patent Number: 4,589,052
[45] Date of Patent: May 13, 1986

[54] DIGITAL I²T PICKUP, TIME BANDS AND TIMING CONTROL CIRCUITS FOR STATIC TRIP CIRCUIT BREAKERS

[75] Inventor: John J. Dougherty, Avon, Conn.

[73] Assignee: General Electric Company, New York, N.Y.

[21] Appl. No.: 631,708

[22] Filed: Jul. 17, 1984

[51] Int. Cl.⁴ .............................................. H02H 7/00
[52] U.S. Cl. ........................................ 361/94; 361/96; 361/97; 364/483
[58] Field of Search ................................ 361/94–97; 364/483

[56] References Cited

U.S. PATENT DOCUMENTS

| | | | |
|---|---|---|---|
| 4,038,695 | 7/1977 | DePuy | 361/96 |
| 4,219,860 | 8/1980 | DePuy | 361/96 X |
| 4,266,259 | 5/1981 | Howell | 361/97 |
| 4,347,541 | 8/1982 | Chen et al. | 361/96 X |
| 4,423,459 | 12/1983 | Stich et al. | 361/94 |
| 4,442,472 | 4/1984 | Pang et al. | 361/96 |
| 4,476,511 | 10/1984 | Saletta et al. | 361/97 X |

FOREIGN PATENT DOCUMENTS 2047995  12/1980  United Kingdom ................... 361/96

*Primary Examiner*—A. D. Pellinen
*Assistant Examiner*—Derek S. Jennings
*Attorney, Agent, or Firm*—Richard A. Menelly; Walter C. Bernkopf; Fred Jacob

[57] ABSTRACT

Digital implementation of the overcurrent determination and time delay before tripping in a static circuit breaker trip unit allows the trip unit circuit to be manufactured in a single chip configuration. The signal after A/D conversion is compared within a magnitude comparator to determine pickup. A pulse stream proportional to the square of the overcurrent signal is developed by multiplying the outputs of two magnitude comparators which compare the A/D level with a continuous binary count. The time delay determination is obtained by means of 3 cascade connected divide by two counters with their outputs connected to a data selector, or by a rate-limiter circuit which uses a fixed frequency to gate a pulse stream proportional to the overcurrent level squared.

48 Claims, 11 Drawing Figures

PEAK DETECTING A/D CONVERTER  48

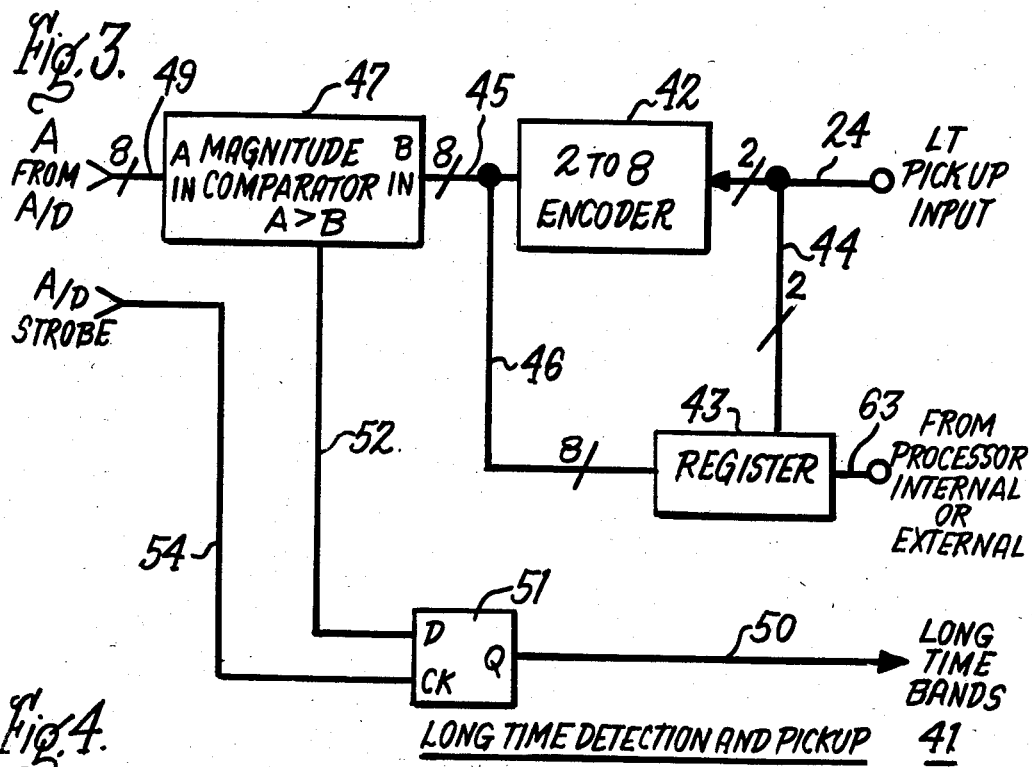
Fig. 3. LONG TIME DETECTION AND PICKUP 41
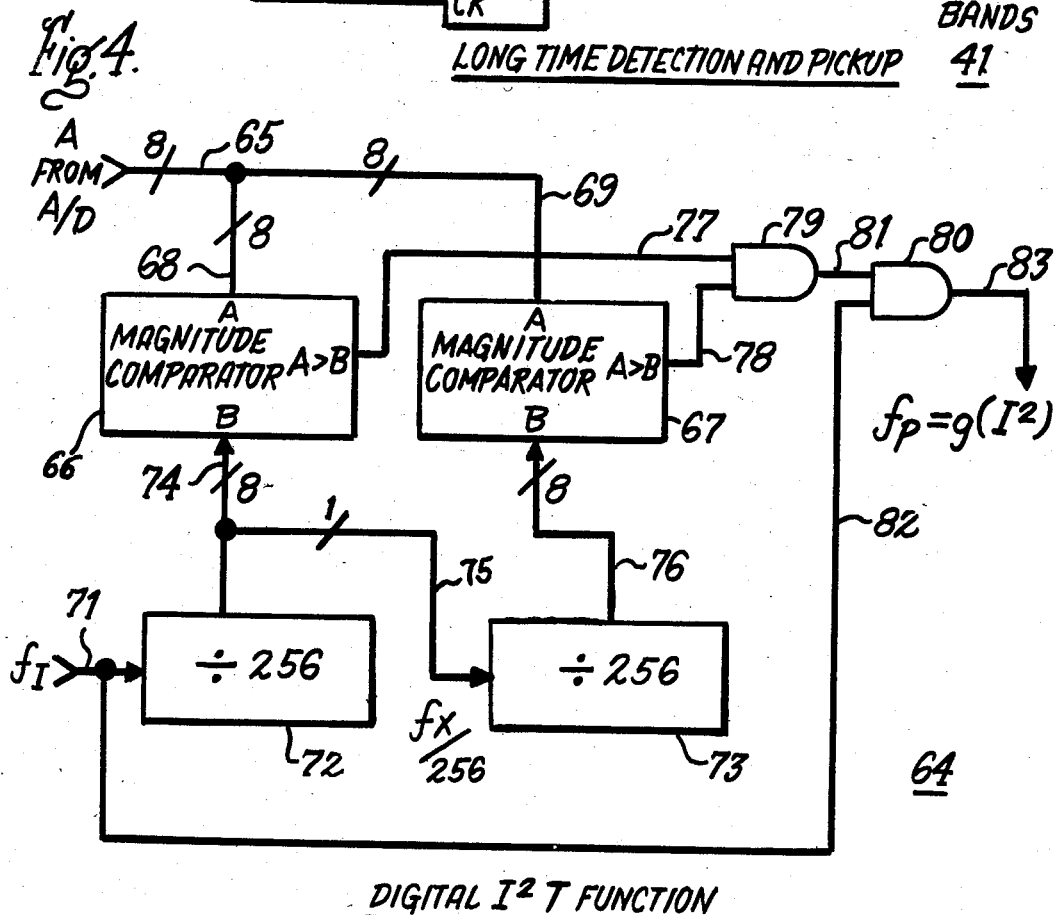
Fig. 4. DIGITAL $I^2 T$ FUNCTION 64

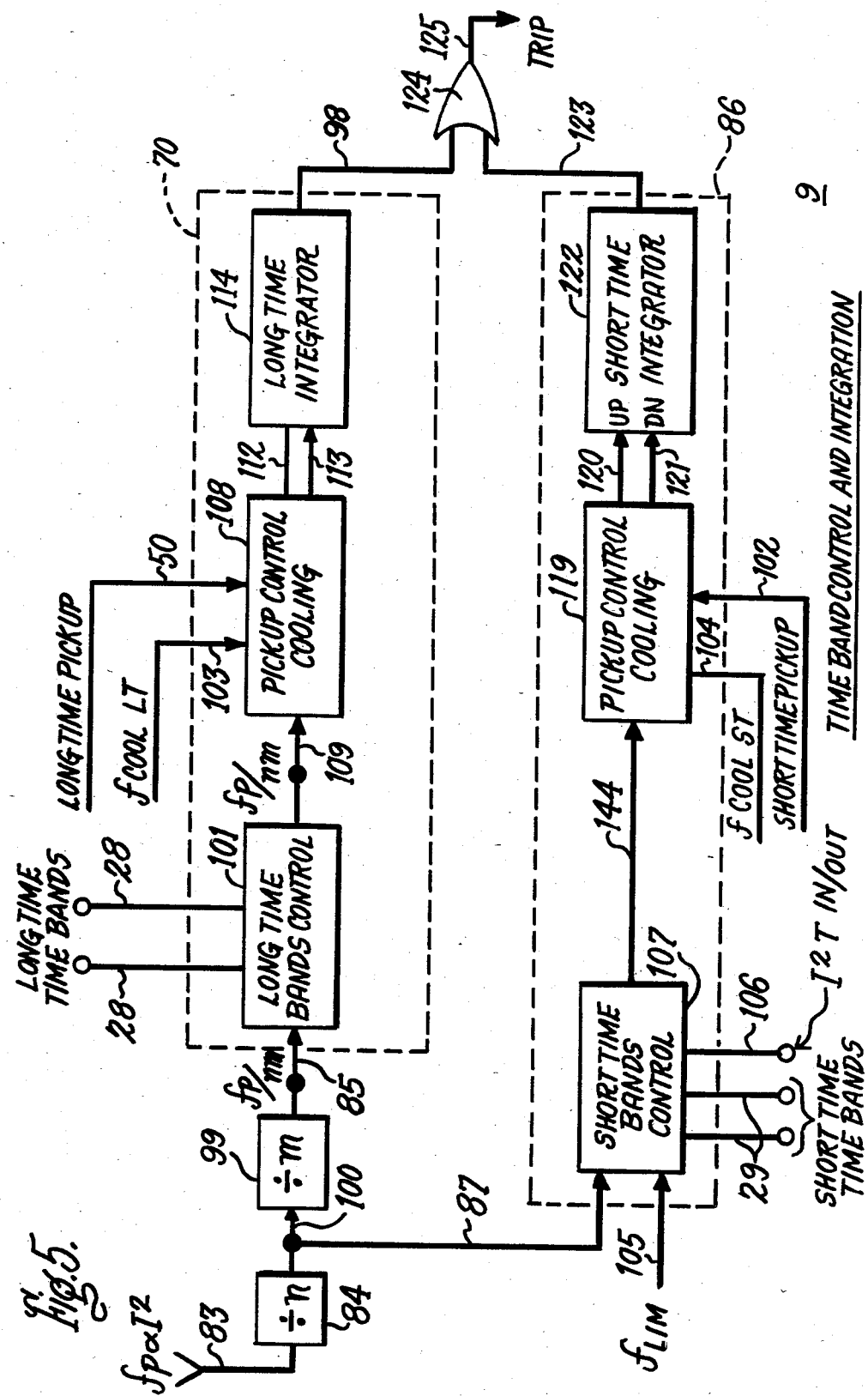

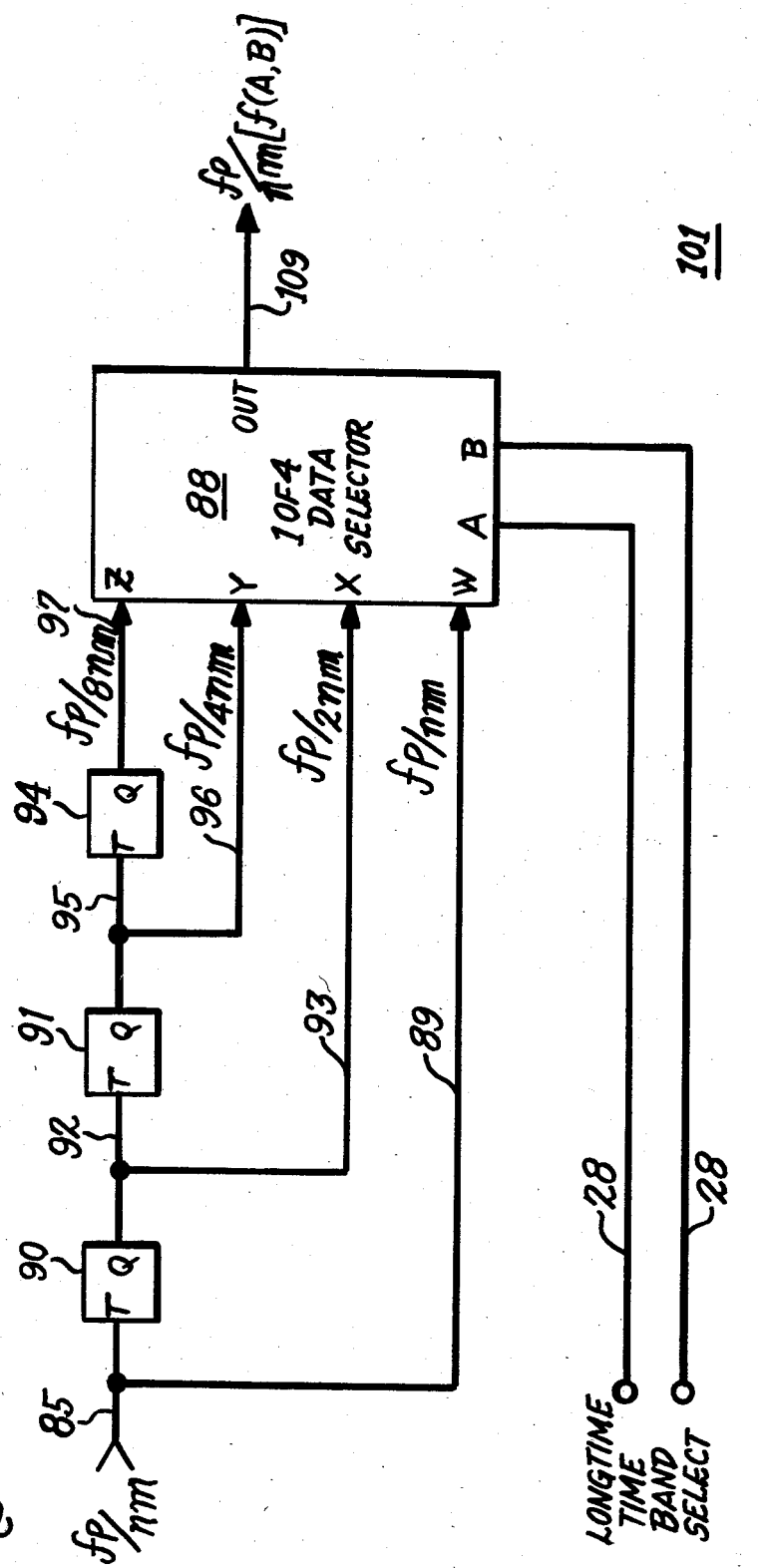

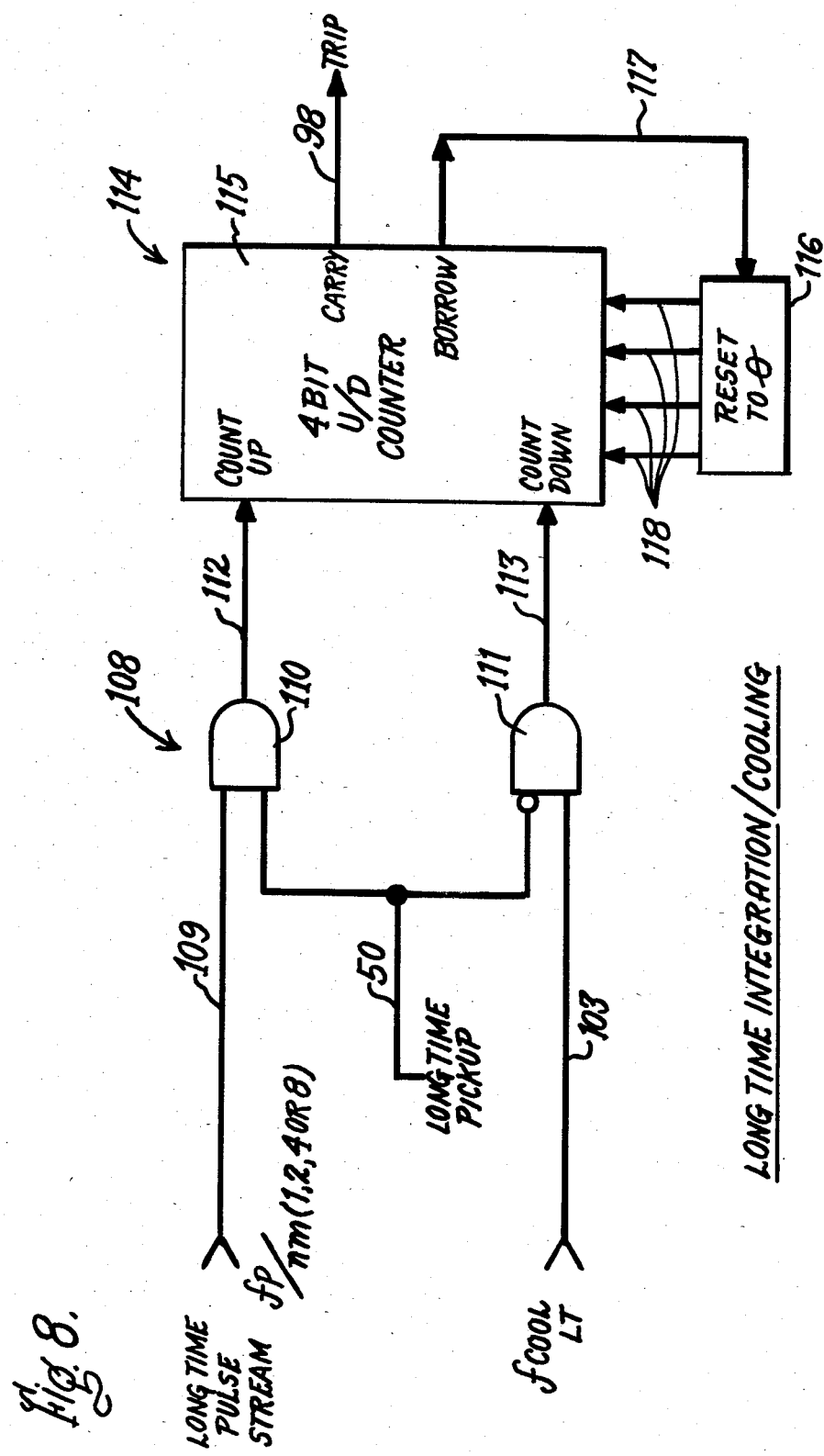

DIGITAL I²T PICKUP, TIME BANDS AND TIMING CONTROL CIRCUITS FOR STATIC TRIP CIRCUIT BREAKERS

BACKGROUND OF THE INVENTION

Static trip circuit breakers which rely on electronic rather than thermal and electromagnetic current responsive trip unit elements are readily available in complete analogue implementation as well as in digital implementation in part. The digital implementation of the trip unit circuitry generally requires a digital processor for providing at least the time delay determination by calculating $I^2t$ or by referring to stored values. U.S. Pat. No. 4,266,259 to E. K. Howell describes an analogue static trip unit which utilizes some circuit elements that are not easily implemented by integrated circuit techniques. U.S. Pat. No. 4,038,695 to R. P. DePuy utilizes an A/D converter and a binary counter to provide the time delay while performing the overcurrent "pickup" condition in a manner similar to that described by Howell.

U.S. Pat. Nos. 4,423,459; 4,347,541 and 4,442,472 each discloses variations of analogue and digital implementation of both overcurrent pickup and time delay within a single static trip unit circuit. All of the aforementioned patents are incorporated herein for purposes of reference.

Microprocessor-based static trip units are commercially available which utilize an A/D converter along with volatile and non-volatile memory elements for storing time over current data and for determining time delay by means of programs stored within the non-volatile memory elements. One such microprocessor-based static trip unit is described within co-pending U.S. patent application Ser. No. 626,341—filed 6/29/84 which application is incorporated herein for reference purposes and should be referred to for a detailed description of both stored time delay and protective relay algorithms.

From a cost standpoint it would be highly desirable to incorporate the entire static trip unit circuit within a single chip to facilitate automated processing of the overall breaker assembly. It is not known at this time whether any of the hybrid analogue and digital circuits described earlier are capable of complete implementation by means of very large scale (VLSI) integrated circuit techniques. Most known static trip units employ analogue comparators to determine overcurrent pickup and utilize digital counters to provide the requisite time delays. This combination of analogue and digital circuit elements is not readily implemented within a single integrated circuit chip.

The present invention is capable of complete integration by V.L.S.I. implementation by providing the current squaring function, the overcurrent pickup function as well as the time delay function by digital circuitry. The complete trip unit of the invention is capable of automated assembly by insertion of a 40 pin circuit chip containing all the trip unit functions within the breaker control module. It is contemplated that the compact size and low cost of the trip unit chip will allow a wide range of commercial breaker frame sizes to utilize the electronics provided by the chip in place of the thermal and electromagnetic trip components now presently being utilized in the smaller frame sizes.

SUMMARY OF THE INVENTION

A completely digital trip unit for static trip circuit breakers is implemented within a single integrated circuit chip. Magnitude comparators are utilized for overcurrent pickup function while the time delay and integration are provided by divide by two counters and a data selector. The various trip options as well as frame size rating are selectable by external digital switch adjustments.

BRIEF DESCRIPTION OF THE DRAWINGS

FIG. 3 is a circuit diagram of the pickup detection circuit within the trip unit of FIG. 1;

FIG. 4 is a circuit diagram of the squaring circuit within the tip unit of FIG. 1;

FIG. 5 is a circuit diagram of the time band control and integration circuits within the trip unit of FIG. 1;

FIG. 6 is a circuit diagram of the long time band control circuit within the trip unit of FIG. 1;

FIG. 7 is a circuit diagram of the short time band control circuit within the trip unit of FIG. 1;

FIG. 8 is a circuit diagram of the long time integration or cooling circuit within the trip unit of FIG. 1;

DESCRIPTION OF THE PREFERRED EMBODIMENT

Figure 1:
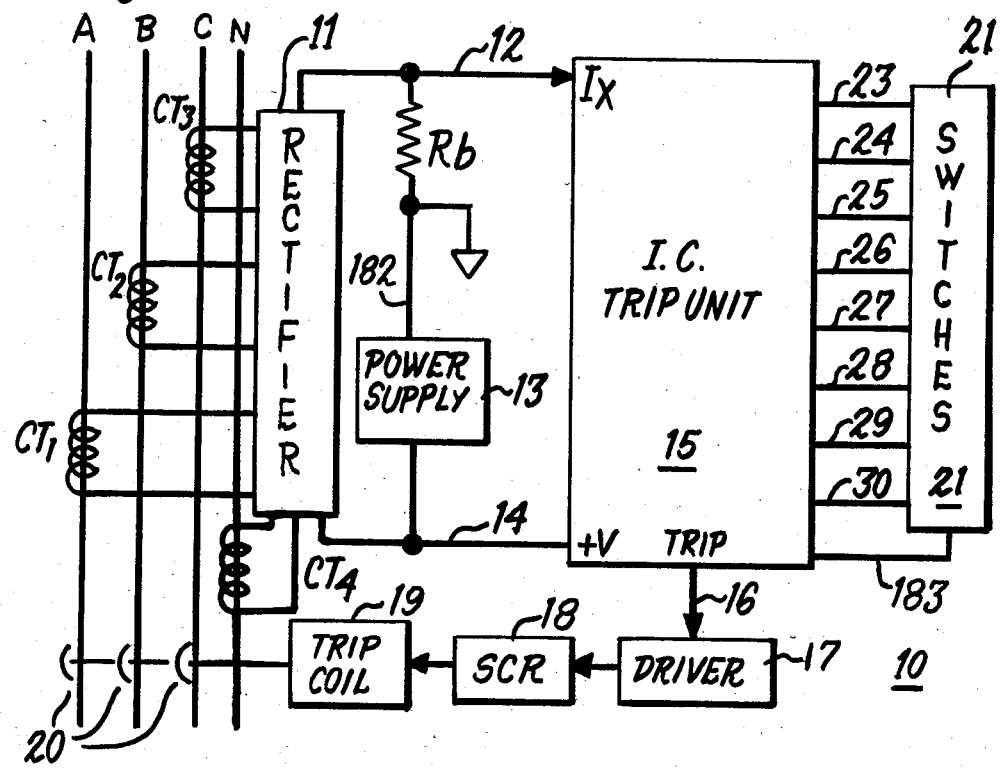
FIG. 1 is a circuit block diagram of the digital circuit breaker trip unit of the invention.

The circuit breaker circuit 10 is shown in FIG. 1 wherein the three phase conductors ABC are sensed by means of current transformers $CT_1$–$CT_3$ which provide a composite current value which is rectified within rectifier 11. An additional current transformer CT4 may be included to measure ground fault signals on a 4 wire electrical system which includes a neutral conductor N. A voltage value indicative of the composite current is developed across a burden resistor Rb which is inputted to the integrated circuit trip unit 15 by means of negative bus 12. A power supply 13 connecting between ground by means of line 182 and the positive bus 14 receives its operating power from the same current transformers. When a trip output signal is generated within trip unit 15 a control signal is sent over line 16 to a driver circuit 17 for gating an SCR 18 which allows operating current to flow through the flux-shift trip coil 19 thereby opening the contacts 20 in each of the three phases. The integrated circuit trip unit or "chip" 15 is a 40 pin very large scale integration (VLSI) implementation which will be discussed below in some detail. A plurality of digital switches shown generally at 21 is all that is required for setting the various interrupting levels and time delays as well as the various options available within the chip 15. The adjustable current setting which varies the level of current the breaker will carry indefinitely without tripping is provided over the resistance network lines 23. The long time (LT) overcurrent "pickup" value is adjustable over the long time pickup lines 24. The short time (ST) pickup, ground fault pickup and instantaneous pickup lines are generally indicated at 25–27 respectively. Although these adjustable pickup lines are designated by means of a single line there are generally two or three lines interconnecting with the switches 21 depending on the number of bits used for digitally representing the plurality of adjustable current values. The time "bands" which represent the ranges in time corresponding to the pickup values before a trip signal is initiated are provided by the long time band lines 28, short time band lines 29 and ground fault (GF) time bands lines 30. A single line 183 connects one of the digital switches to the chip 15 to select short time $I^2t$ IN/OUT.

Figure 2:
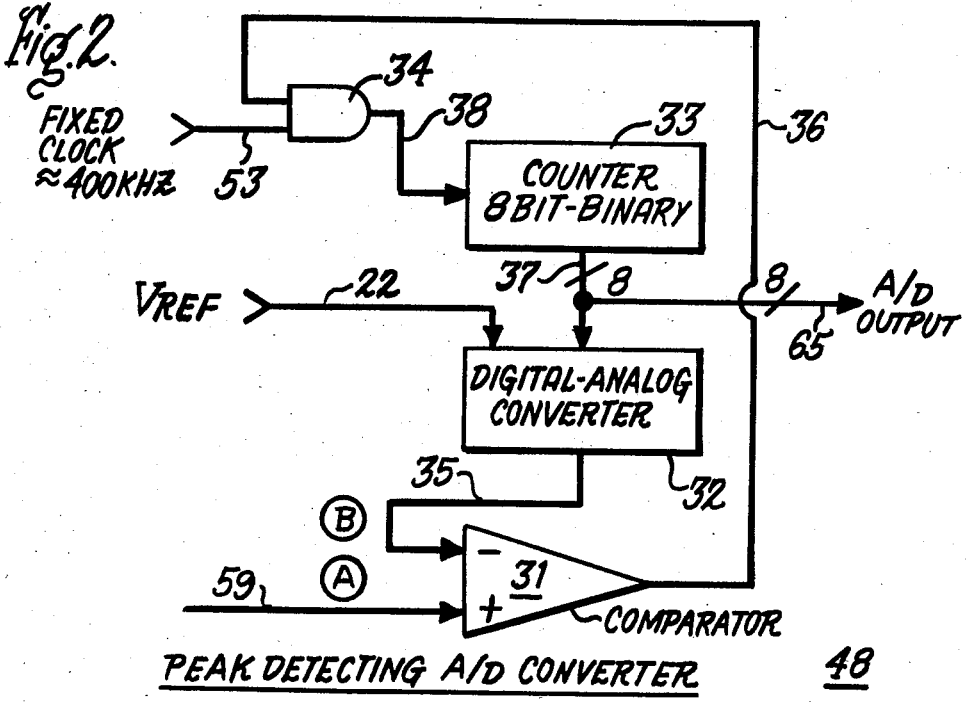
FIG. 2 is a circuit diagram of the peak detecting A/D circuit within the trip unit of FIG. 1.
Figure 2:
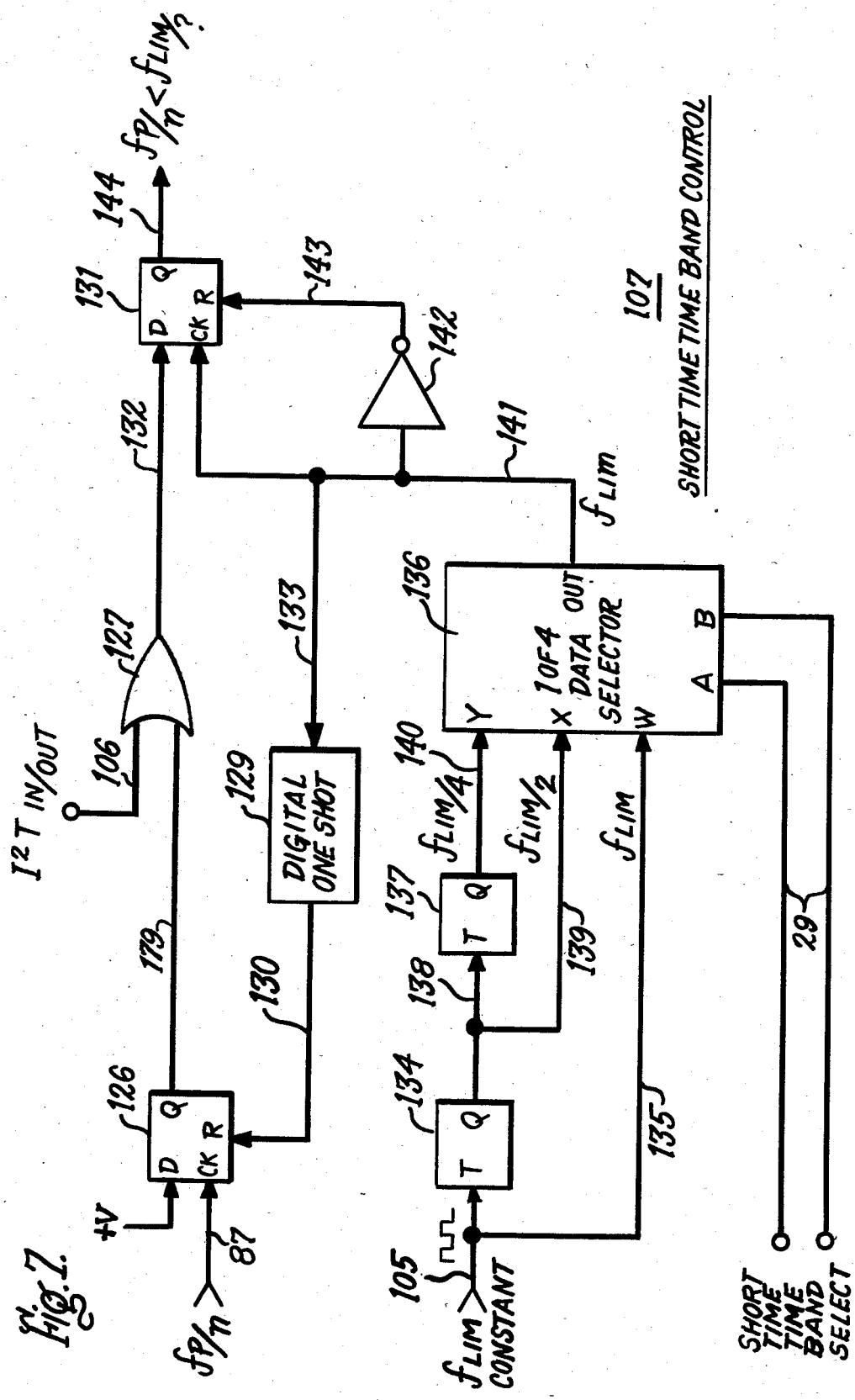
Figure 9:
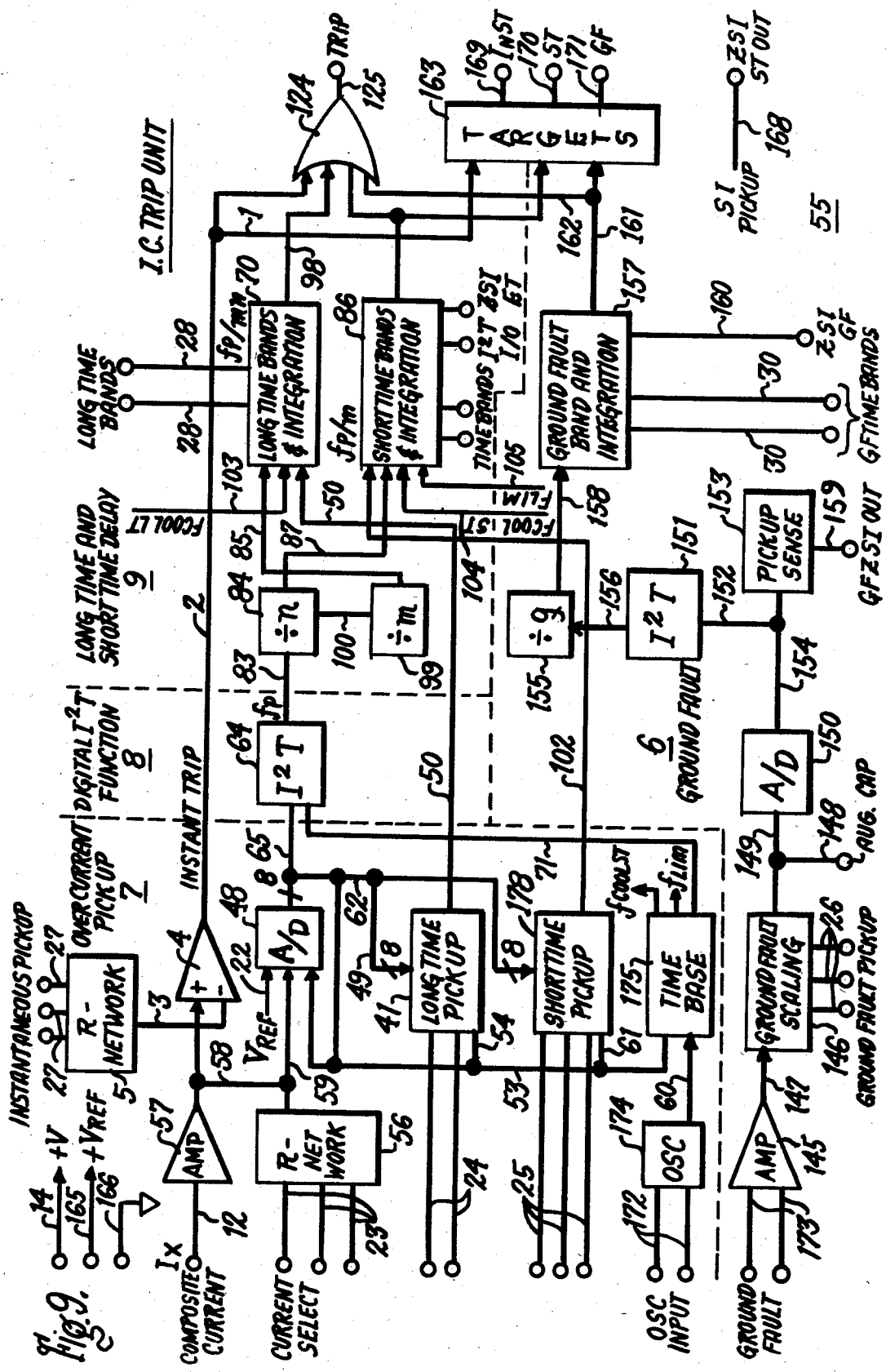
FIG. 9 is a circuit diagram of the trip unit of FIG. 1 in an integrated circuit chip.

The peak detecting A/D circuit 48 within chip 15 of FIGS. 1 and 9 is also shown in FIG. 2. The composite current output from amplifier 57 of FIG. 9 is inputted to comparator 31 over lines 58,59 at input A and is compared with the output of a D/A converter 32 at the B input of the amplifier by means of line 35. An 8 bit binary counter 33 provides a predetermined parallel 8 bit input over line 37 to the D/A converter and the output of the amplifier is connected in a feedback loop to one input of an AND gate 34 by means of line 36. The other input to the AND gate is provided with a fixed clock pulse of approximtely 400 KHZ by connection with line 53 from the time base 175. After the comparison is made, an output pulse is provided to the clock input of the counter over line 38 to complete the feedback loop.

Figure 10:
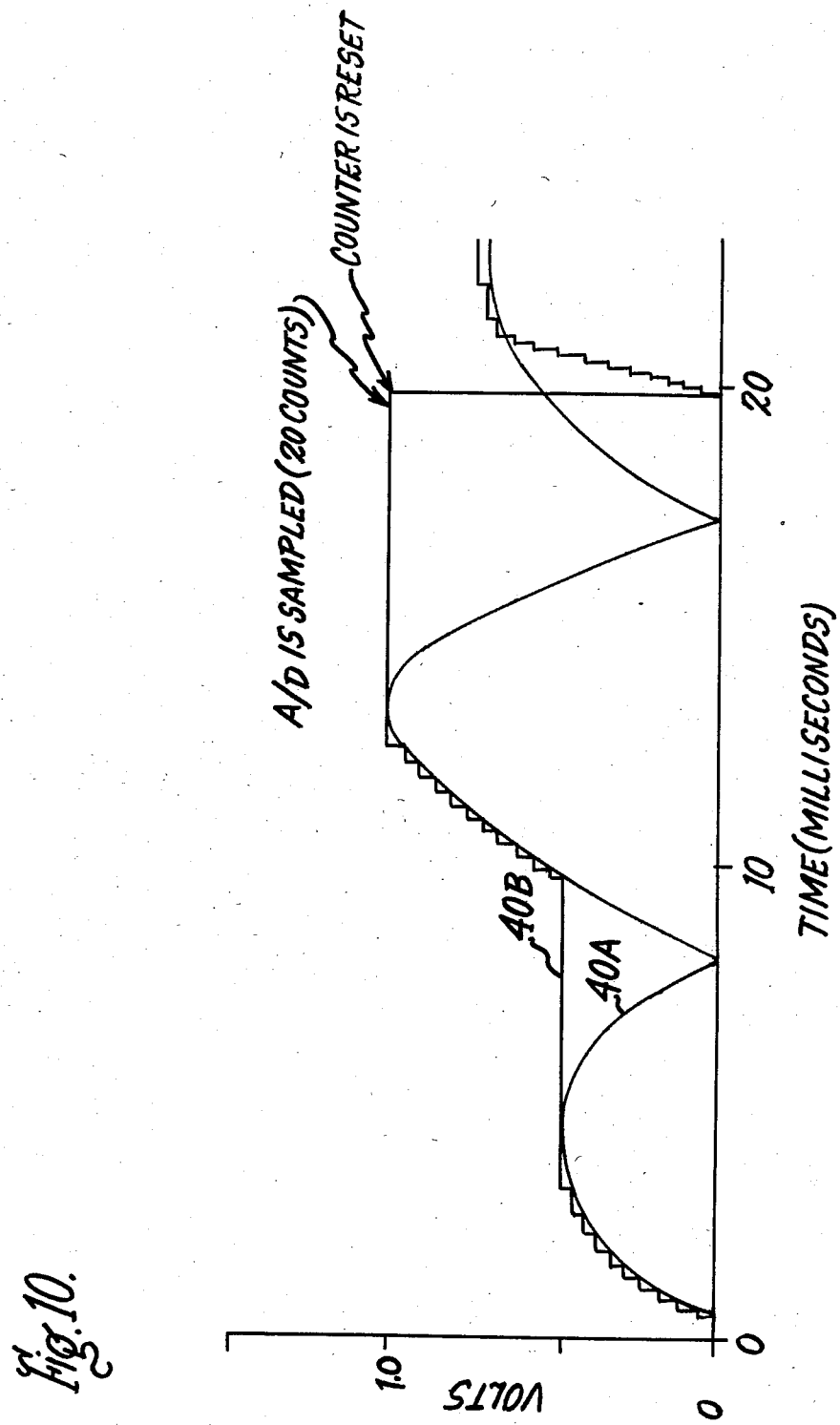
FIG. 10 is a graphic representation of the composite current and D/A output waveforms within the peak detecting A/D circuit of FIG. 2.

The peak detection and A/D conversion can be seen by comparing the composite current waveform 40A to the D/A waveform 40B shown in FIG. 10. The time comparison is made within the AND gate 34 while the magnitude determination is made within the comparator 31. The counter 33 is reset every 20 milliseconds which provides a composite current sample rate of 50 per second. The 8 bit data output on $I^2t$ line 65 therefore represents a digital value controlled by the peak value of the composite current appearing on line 59.

OVERCURRENT PICKUP

The complete circuit 55 for chip 15 of FIG. 1 is depicted in FIG. 9. The chip circuit is divided into 4 regions for descriptive purposes. The ground fault region 6 is optional while the overcurrent pickup, $I^2t$, LT, ST, time delay regions 7–9 are generally required for most applications but can also be offered as customer selected options by external adjustments to these circuits. The long time pickup circuit 41 is shown in FIG. 3 and like reference numerals will be employed throughout for common circuit elements within all the drawing figures. The long time pickup option is selected by means of a first digital data bit adjustment within one of the encoded eight position rotary switches which although not shown are included within the digital switches 21 of FIG. 1. Also selected by means of a separate rotary switch connected with the resistance network lines 23 are the digital data bits for the resistors which are also contained within the resistance network 56. This resistor adjustment can be from 50 to 100 percent of the current rating for a particular breaker frame size and thereby allows the trip unit chip 15 to be used over a wide range of breaker frame sizes. The composite current value is inputted at negative bus 12 in FIG. 9 through a buffer amplifier 57 and line 58 onto line 59, which connects the output of the resistance network 56 with the input to the peak detecting A/D converter circuit 48.

The time base circuit 175 receives a clocking pulse from oscillator 174 over time base line 60 and outputs an A/D strobe pulse over the A/D strobe line 53. The A/D strobe pulse is applied to the long time pickup circuit 41 over the long time pickup strobe line 54. Referring to FIGS. 3 and 9, the long time pickup operates in the following manner. An 8 bit signal representing the composite current peak value from the peak detection A/D circuit 48 is applied over lines 62 and 49 to the A input of the magnitude comparator 47. In both figures, the lines carrying 8 bit and 2 bit data are indicated accordingly. A fixed 8 bit signal from the 2 line to 8 line encoder 42 is applied to the B terminal over line 45. Four long time pickup levels can be selected digitally with two bits which are supplied to the 2 to 8 encoder 42 over the long time pickup lines 24 by means of an encoded 8 position rotary switch contained within the switch module 21 described earlier with reference to FIG. 1. The 2 bit signal can also be entered from a register 43 over line 44. The register is set from a digital processor over line 63 should such processor be available either internally within the trip unit or external thereto. The 8 bit signal would then be supplied to the B input of the magnitude comparator 47 over line 46 as indicated. The register 43 is an optional means for providing the long time pickup data bits and is not required if a digital processor is not to be employed. The 2 to 8 encoder 42 decodes the two input bits and provides 8 bit levels which are equivalent to the value received from the peak detecting A/D converter circuit 48 at the long time pickup level selected. The 8 bit digital magnitude comparator 47 tests long time pickup signal over the long time pickup line 50 to control the long time bands circuit 70. The short time pickup circuit 178, although not shown in detail, contains identical components and operates in a similar manner to select the short time pickup bands over the short time pickup lines 25 and to produce a short time pickup signal over the short time pickup line 102 to control the short time bands circuit 86. Before describing the operation of the long time bands circuit it is helpful to understand the function of the $I^2t$ circuit 64 which is shown in FIG. 4.

$I^2t$ Circuit

The 8 bit output from the peak detecting A/D converter circuit 48 of FIG. 9 is connected by means of line 65 to the input of the $I^2t$ circuit 64 within the digital $I^2t$ region 8 and provides the 8 bit data representative of the peak composite current. A fixed frequency $f_f$ is inputted to the $I^2t$ circuit 64 from time base circuit 175 over line 71. The function of the $I^2t$ circuit is to provide an output frequency $f_p$ which is proportional to the square of a binary input value. The 8 bit signal from peak detecting A/D converter circuit 48 is applied over line 65 to the A inputs of a pair of magnitude comparators 66, 67 over lines 68 and 69 as shown in FIG. 4. The first 8 bits of a 16 bit free running binary up-counter 72 is applied to the B input of magnitude comparator 66 over line 74 and the last 8 bits of a similar 16 bit free running binary up-counter 73 is applied to the B input of the magnitude comparator 67 over line 76. The input to the binary up-counter 73 is connected with the output of the binary up-counter 72 by means of line 75. The A>B outputs of both magnitude comparators are applied to both inputs of a 1st AND gate 79 by means of lines 77 and 78. The output of each of the two magnitude comparators 66, 67 comprises a pulse width modulated signal in which the "on" of the pulse P is equal to the magnitude of the signal A appearing at the output of the peak detecting A/D converter circuit 48 of FIG. 9 at line 65. This is represented by the expression P=A÷256. The composite proportions CP of the two outputs are multiplied within the 1st AND gate 79 of FIG. 4 resulting in a composite proportional signal equal to the square of the output of the peak detecting A/D converter circuit 48 divided by (256)². The relation is then CP=A²÷(256)². The output of the 1st AND gate 79 is connected to the input of a second AND gate 80 by means of line 81 and the other input to the second AND gate is connected to the I²t strobe line 71 by means of line 82. The resulting pulse rate $f_p$ appearing at the output of the second AND gate 80 on line 83 is proportional to both the output of the peak detecting A/D converter circuit 48 and the fixed frequency $f_I$. The expression for this is given by $f_p = A^2 \div (256)^2 * f_I$ since A² is related to the original composite current I, the composite pulse rate $f_p$ is proportional to the square of the composite peak current hence satisfies the I²t function. The pulse rate $f_p$ is applied over line 83 to a divide by n counter 84 as shown in FIG. 9. When the pulses reach a count of "n", an output signal is provided to the long time bands circuit 70 over line 85 and to a short time bands circuit 86 over line 87. Time t which represents the time portion of the I²t function is now represented by the expression $t = n \div f_p$ which reduces to the expression $$t = K \frac{n}{A^2}$$

where K is equal to $f_I \div (256)^2$ since $f_I$ is a constant. This representation of an I²t function is superior to the known use of voltage contolled oscillators (VCO) because the pulse stream frequency for any given proportion of full scale overcurrent is exactly determined by a fixed frequency oscillator which can be set very accurately. Also, unlike the VCO approach, the A/D output is used for both pickup and I²t, such that the pickup and timing are linked in a deterministic manner.

Long Time and Short Time Delay

The long time and short time delay region 9 of FIG. 9 is shown in FIGS. 5 and 6 where the output of the digital I²t function region 8 of FIG. 9 consisting of the I²t circuit 64 is inputted to the divide by n counter 84. The output pulse train $f_p$, which is proportional to the peak composite current squared, is decreased to a rate suitable for short time integration, $f_p/n$. For long time integration, the pulse train passes through the divide by m counter 99 over line 100. This is required because a longer time-to-trip function is required for long time pickup. A selection of four time bands may be provided to improve selectivity with upstream and downstream circuit breakers in a system. This is accomplished within the counter and data selector circuit 101 which is connected to the m counter by means of line 85. The long time bands adjustments are made by the long time bands lines 28. The counters within the data selector circuit 101 shown in FIG. 6 include a first divide by two counter 90 connecting with line 85 by means of its T input and with the W input of a one of four data selector 88 by means of line 89. The Q output of the first divide by two counter is connected with the T input of a second divide by two counter 91 by means of line 92 and with the X input of the data selector by means of line 93. The Q output of the second divide by two counter is connected with the T input of the third divide by two counter 94 by means of line 95 and with the Y input of the data selector by means of line 96. The Q output of the third divide by two counter is connected with the Z input of the data selector. The long time bands lines 28 connecting with the A and B terminals of the data selector 88 allow one of the four pulse streams to be selected within the data selector for passing to the long time pickup control and cooling circuit 108 by means of line 109.

Long Time Integration and Cooling

The long time bands control circuit 101 and long time pickup control and cooling circuit 108 within the long time bands circuit 70 shown in FIG. 5 receive the selected pulse stream over line 109 for upwards integration with a pre-set long time cooling frequency over line 103 for downward integration. The circuit detects the presence (upwards) or absence (downwards) of a long time pickup signal over long time pickup line 50. The long time pickup control and cooling circuit 108 is shown in FIG. 8 as consisting of a pair of first and second AND gates 110, 111 wherein the long time control line 109 connects with one input of the first AND gate to provide the selected long time pulse stream. An input to the second AND gate 111 is supplied with a preselective cooling frequency over line 103. The long time pickup signal is applied in common to the other inputs to both AND gates 110, 111 by means of the long time pickup line 50. The output of the first AND gate 110 is supplied to the COUNT UP input of a four bit up/down counter 115 by means of line 112. After sixteen counts, the four bit up/down counter provides an output pulse at its CARRY output over line 98 to trip the breaker. The fixed clock pulse which comprises the cool down frequency, is compared with the long time pickup signal within the second AND gate 111 which is connected to the COUNT DOWN input of the four bit up/down counter over line 113. If the overcurrent condition ceases to exist, the absence of a signal on the long time pickup line 50 allows pulses from the cool down frequency line, 103 to pass through to the count down input over line 113 which subtracts from the counts that were accumulated within the four bit up/down counter during the pickup condition when the output of the first AND gate 110 was pulsing. The four bit up/down counter 115 together with the control module 116 connecting by means of input lines 118 and receiving a BORROW signal from the borrow output terminal over line 117, which holds the up/down counter at its minimum count, comprise the long time integrator circuit 114 depicted in FIG. 5.

Short Time Bands Control

The short time bands control function is accomplished within the rate limit or short time bands control circuit 107 shown in FIGS. 5 and 7. The selected pulse train is inputted to a first D flip flop 126 in FIG. 7 by connecting the short time pulse line 87 with the CLOCK input of the flip flop. The D input is connected with a voltage source to provide a true ("1") input. The Q output terminal of the flip flop is connected with one input of an OR gate 127 over line 179 for comparing with the signal on the I²tI/O line 106. Each pulse on line 87 sets the first flip flop 126 which then provides an input to the second flip flop 131 through the OR gate. The D input to the second flip flop 131 is connected to the output of the OR gate 127 by means of line 132. A fixed frequency $f_{lim}$ is connected to the T input of a divide by two counter 134 by means of line 105 and to the W input of a one of four data selector 136 by means of line 135. The Q output of the 1st divide-by-2 counter 134 is connected with the T input of a second divide by two counter 137 by means of line 138 and to the X input of the one of four data selector 136 by means of line 139. The Q output of the second divide by two counter 137 is connected with the Y input of the one of four data selector by means of line 140. The output of the one of four data selector is connected both with the clock terminal of the second flip flop 131 by means of line 141 and with the reset terminal of the second flip flop 131 through inverter 142 and line 143. The output of the one of four data selector is also connected with the reset terminal of the first flip flop 126 through a digital one shot 129 and line 130. The short time bands select lines 29 which connect with the A and B input terminals of the one of four data selector 136 are decoded to select the fixed frequency $f_{lim}$, $f_{lim} \div 2$ or $f_{lim} \div 4$. Since the output of the second flip flop 131 within the rate limit or short time bands control circuit 107 of FIG. 5 is inputted to the pickup control cooling circuit 119 by connection through line 144, the output is limited by the selected clocking pulse. The connection between the OR gate 127 and the $I^2tI/O$ line 106 in FIG. 7 operates in the following manner. When $I^2t$ OUT is selected, a constant pulse rate appears at the Q output of the second flip flop 131. When $I^2t$ IN is selected, no output occurs at the Q output of the second flip flop 131 for frequency pulses occuring on the short time pulse line 87 greater than the selected fixed frequency clock pulse described earlier. The selected clock pulse is used to reset both the first flip flop 126 immediately, and the second flip flop 131 after a half cycle. Within the short time bands circuit 86 in FIG. 5, the pickup control and cooling circuit 119, which receives the output control pulse from line 144, is also provided with a short time cooling frequency over line 104 and a short time pickup signal over line 102. The output of the pickup control and cooling circuit 119 is connected with the COUNT UP input of a short time integrator 122 over line 120 as well as with the COUNT DOWN input of the short time integrator over line 121. The output of the short time integrator is connected with one input to the OR gate 124 by means of line 123 and provides a trip signal at the output of the OR gate over line 125 in a manner similar to that described for the long time integrator circuit 114 depicted in FIG. 8.

Integrated Circuit Trip Unit

Figure 11:
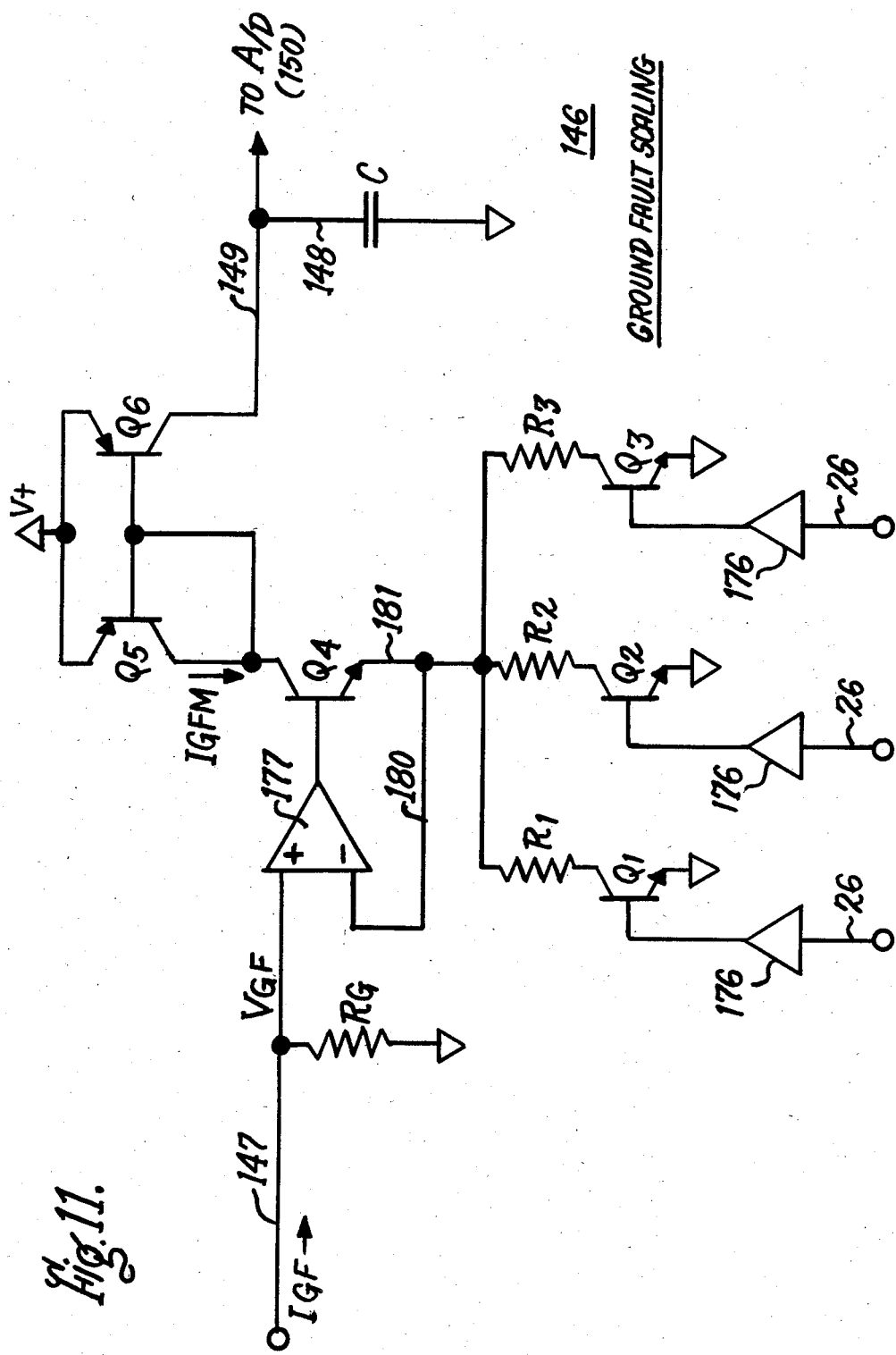
FIG. 11 is a circuit diagram of the ground fault scaling circuit within the integrated circuit chip of FIG. 9.

As described earlier, the complete IC chip circuit 55 shown in FIG. 9, is divided into four regions, namely ground fault 6, overcurrent pickup 7, $I^2t$ function 8, and long and short time delay 9. Chip 55 is implemented in a 40 pin format which pins are identified by their connecting lines as indicated in FIG. 9 and referenced within FIGS. 1-8. Line 14 represents the positive voltage bus shown in FIG. 1 while line 12 represents the negative bus which receives the sensed composite current. Line 165 is connected to a positive reference voltage source and line 166 connects with ground. The oscillator input lines 172 connect with the oscillator 174, which in turn provides the various frequencies employed within time base 175 and is connected to the time base by means of line 60. The ground fault region 6 is similar in operation to the method of detecting long time pickup as well as long time integration and cooling as described earlier. The ground fault current is sensed by means of the ground fault current transformer $CT_4$ which surrounds the neutral conductor N as shown in FIG. 1. The sensed ground fault current on lines 173 in FIG. 9 is processed through amplifier 145 and is multiplied within the ground fault scaling circuit 146 which is connected to the amplifier by line 147. The ground fault pickup lines 26 provide desired ground fault pickup values and, upon the occurence of a ground fault pickup, the ground fault scaling circuit 146 provides a signal to an A/D converter 150 over line 49 and to an external averaging capacitor C over line 148 as shown in FIG. 11. The ground fault scaling circuit 146 comprises a resistor-amplifier network which multiplies the sensed ground fault current $I_{GF}$ over line 147 and ground fault resistor $R_G$ by a digital value set by the ground fault pickup lines 26 to provide a selected ground fault current $I_{GFM}$. The ground fault pickup lines connect to three weighted resistors $R_1$–$R_3$ through buffer amplifiers 176. The input ground fault current $I_{GF}$ on line 147 is converted to a voltage, $V_{GF}$ by resistor $R_G$. Amplifier 177 is set as a voltage follower which re-creates voltage $V_{GF}$ on line 180 through switching transistor $Q_4$. The selected ground fault current $I_{GFM}$ through current mirror transistors $Q_5$, $Q_6$ and transistor $Q_4$ is a function of both the ground fault voltage $V_{GF}$, which is the product of $I_{GF} \times R_G$, and the weighted resistors $R_1$–$R_3$ selected by ground fault pickup lines 26. This selected ground fault current, $I_{GFM}$ which flows through line 181 equals $V_{GF}$ divided by $R_1, R_2, R_3$. Since $V_{GF}$ equals $I_{GF} \times R_G$, $$I_{GFM} = I_{GF} \frac{R_G}{R_1, R_2, R_3}$$

such that $I_{GFM}$ is a multiple of $I_{GF}$ controlled by the selected resistors. This is one of several scaling techniques that could be applied similar to current mirror scaling, $I_{GM}$ pulse width modulation or digital multiplication. The selected ground fault current $I_{GFM}$ is connected to the integrating capacitor C over lines 148 and 149 through the current mirror consisting of transistors $Q_5$ and $Q_6$. The integrated ground fault value is then transmitted to the ground fault A/D circuit 150 as shown in FIG. 9. The digital representation of the ground fault pickup value from A/D circuit 150 is sensed within the pickup sense circuit 153 over line 154 and a ground fault zone selective interlock signal is outputted over line 159 in a manner similar to that described within the aforementioned Howell patent. The digital pickup pulse is transmitted to the ground fault $I^2t$ circuit 151 over line 152 and is squared within the $I^2t$ circuit 151 in a manner similar to that described for the digital function $I^2t$ circuit 64 before inputting to a divide by Q counter 155 by means of line 156. The ground fault time bands and integration circuit 157 which is connected to the divide by Q counter by means of line 158, provides a similar function to that described for the short time bands and integration circuit 86, such that the ground fault time bands are externally adjustable over lines 30 and the zone selective interlock for the ground fault section is provided by means of line 160. A plurality of target terminals 163 for providing indication of the occurence of various overcurrent conditions, is connected to the ground fault time bands integration circuit 157 by means of line 161. A good description of a target circuit for use within target terminals 163 is given with U.S. Pat. No. 4,274,121 also in the name of E. K. Howell which is incorporated herein for purposes of reference. If the ground fault condition exceeds the selected ground fault time delay within the ground fault time bands and integration circuit 157, a trip signal is provided over lines 161 and 162 to the OR gate 124 to provide a trip signal on the trip line output 125 while at the same time energizing one of the target terminals 163 to provide remote indication over line 171.

An instantaneous trip function is provided by connection of the output of amplifier 57 to one input of a comparator 4 and by connection to the negative input of the comparator to resistance network 5 over line 3. The resistance network 5 for instantaneous pickup and the resistance network 56 for current selection shown in FIG. 9 are similar to that described earlier within the ground fault scaling circuit 146. The instantaneous pickup vaules are selectable within the resistance network 5 by external access to the instantaneous pickup lines 27 similar to the resistance network 56 and current select lines 23 described earlier with respect to both long time and short time pickup. Upon the occurrence of an instantaneous trip current, a signal is provided at the output of comparator 4 onto line 2 which results in a trip signal on the trip output line 125 by connection through OR gate 124. The instantaneous target line 169 is energized by a common connection between the output of comparator 4 and the target terminals 163 through line 1.

The trip circuit chip 55 having 40 external pins is thereby capable of providing most of the options that are selectable with state of the art analogue static trip units. It is to be clearly understood that this circuit is operational with or without access to a digital processor and that no volatile or non-volatile semi-conductor elements are required for storing pickup or time over current values.

I claim:

1. A static trip circuit interrupter comprising:
a pair of electrical contacts;
current sensing means for sensing current within a protected circuit; A/D conversion means for providing a digital output signal representation of said sensed current; interrupter means connected with said current sensing means for operating said electrical contacts; multiple digital comparison means connected with said interrupter means for providing a control signal to said interrupter means to separate said contacts upon occurrence of a sensed current in excess of first or second predetermined overcurrent values which persist longer than first or second pre-determined time delay values; and input means connected with said digital comparison means for providing said first and second pre-determined overcurrent and time delay values to said multiple digital comparison means; wherein said A/D conversion means comprises a comparator for comparing said sensed current to a reference value, the output of said comparator then being multiplied by a first fixed frequency clock pulse within a first logic gate.

2. The circuit interrupter of claim 1 wherein said first logic gate provides a peak output signal when said sensed current exceeds said reference value.

3. The circuit interrupter of claim 2 including a first binary counter having a first count, said first binary counter being connected with the output of said first logic gate to provide a digital representation of said peak output signal.

4. The circuit interrupter of claim 2 further including a register connecting a digital processor with said first magnitude comparator for providing said first or second pre-determined overcurrent values from said digital processor to said first or second magnitude comparator.

5. The circuit interrupter of claim 3 further including a D/A converter connecting said reference value to said comparator for providing an analogue representation of said reference value.

6. The circuit interrupter of claim 3 including a first magnitude comparator within said multiple digital comparison means for comparing said peak output signal with said first or second pre-determined over current values and for providing a first magnitude comparator output signal when said peak output signal exceeds any of said first or second pre-determined overcurrent values.

7. The circuit interrupter of claim 6 including a first flip-flop connected with said first magnitude comparator and with said first fixed frequency clock pulse for providing a first or second overcurrent pickup signal upon occurrence of said first magnitude comparator output signal.

8. The circuit interrupter of claim 6 including a second magnitude comparator connected with said first binary counter and with a second binary counter having a second count, said second magnitude comparator providing a second magnitude comparator output signal when said first count exceeds said second count.

9. The circuit interrupter of claim 6 including a third magnitude comparator connected with said first binary counter and with a third binary counter having a third count, said third magnitude comparator providing a third magnitude comparator output signal when said first count exceeds said third count.

10. The circuit interrupter of claim 9 wherein the output signals of said second and said third magnitude comparators are multiplied within a second logic gate.

11. The circuit interrupter of claim 10 including a third logic gate connected with said second logic gate and with said first fixed frequency clock pulse for providing an output signal proportional to a multiple of said peak output signal.

12. The circuit interrupter of claim 11 including a a first time delay circuit connected with said third logic gate through a divide by n counter and to a second fixed frequency clock pulse for providing a trip signal to said interrupter means.

13. The circuit interrupter of claim 12 further including a divide by m counter connected with said divide by n counter and a second time delay circuit for providing a trip signal to said interrupter means.

14. The circuit interrupter of claim 13 wherein said second time delay circuit comprises:
a short time bands control circuit for comparing said first pre-determined time delay value and said second fixed frequency clock pulse with said multiple of said peak output signal and providing an output signal when the integral of said multiple of said peak output signal persists longer than any of said first pre-determined time delay values; and
a first pickup control and cooling circuit controlled by said first or second overcurrent value for gating said short time bands control circuit output signal and providing a count up signal to a short time integrator, the absence of said first or second overcurrent values gating a third fixed clock pulse providing a count down signal to said short time integrator.

15. The circuit interrupter of claim 13 wherein said second time delay circuit comprises:
a long time bands control circuit connected with said divide by m counter for comparing said second pre-determined time delay values with said multiple of said peak output signal and providing an output signal when the integral of said multiple of said peak output signal persists longer than said pre-determined second time delays;
a second pickup control and cooling circuit controlled by said first or second overcurrent values for gating said long time bands control circuit output signal and for providing a count up signal to a long time integrator, the absence of said first or second overcurrent values gating a fourth fixed frequency clock pulse and providing a count down signal to said long time integrator.

16. The circuit interrupter of claims 14 or 15 further including a fourth logic gate having one input connected with said long time integrator and receiving an input pulse when the number of said count up signals exceeds the number of said count down signals within said long time integrator by a fourth count and having another input connected with said short time integrator and receiving an input pulse when the number of said count up signals exceeds the number of said count down signals within said short time integrator by said fourth count.

17. The circuit interrupter of claim 16 wherein said fourth logic gate provides a trip signal to said interrupter means to open said contacts upon occurrence of an input pulse at either input to said fourth logic gate.

18. The circuit interrupter of claim 17 wherein said short time bands control circuit comprises a second flip-flop receiving said multiple peak output signal at a clock input and receiving multiples of said first pre-determined time delay values at a reset input for providing an input to a fifth logic gate.

19. The circuit interrupter of claim 18 including a first and second divide by two counter and a first data selector connected with both said first and second divide by two counters and said second fixed clock pulse, said first data selector receiving said first pre-determined time delay values and providing an output pulse train inversely proportional to said first pre-determined time delay values.

20. The circuit interrupter of claim 19 including a third flip-flop connecting with said first flip-flop through said fifth gate and receiving an input when said fifth gate input is activated, said third flip-flop receiving both a clock input signal and a reset signal from said data selector.

21. The circuit interrupter of claim 20 wherein said fifth logic gate receives an input proportional to said multiple of said peak sensed current signal and provides an input to said third flip-flop.

22. The circuit interrupter of claim 18 wherein said data selector provides a reset signal to said third flip flop through an inverter.

23. The circuit interrupter of claim 17 wherein said long time bands control circuit comprises third, fourth, and fifth divide by two counters connecting with said multiple of said peak sensed current signal and a second data selector, said second data selector receiving said second pre-determined time delays and providing an output pulse train inversely proportional to said second pre-determined time delay values.

24. The circuit interrupter of claim 23 wherein said second pickup control and cooling circuit comprises a sixth logic gate receiving said multiple of peak output signal and said first or second overcurrent values for providing a count-up signal to said long time integrator.

25. The circuit interrupter of claim 24 further including a seventh logic gate receiving said first or second overcurrent values and said fourth fixed clock pulse for providing a count down signal to said long time integrator.

26. The circuit interrupter of claim 16 wherein said long time and short time integrator each comprise a four bit up/down counter wherein a carry output from said up/down counter provides a trip signal to said interrupter means for opening said contacts and wherein a borrow output from said up/down counter is connected back to the up/down counter through a reset module.

27. The circuit interrupter of claim 1 further including a multiplying circuit connecting with said A/D connersion means and a burden resistor for providing multiples of a resistance value assigned to said burden resistor for inputting to said A/D conversion means along with said sensed current value.

28. The circuit interrupter of claim 27 wherein said multiplying circuit comprises a plurality of resistors electrically connected in parallel and a corresponding plurality of switching transistors for switching selected ones of said multiple resistors in electric circuit with said burden resistor.

29. The circuit interrupter of claim 28 further including an amplifier having one input connected with said burden resistor and another input connected with said parallel resistors.

30. The circuit interrupter of claim 29 further including a control transistor having a base connected to an output from said amplifier and an emitter connected in common with another input to said amplifier and said parallel resistors.

31. The circuit interrupter of claim 30 including a pair of current mirror transistors connecting between a reference voltage and a collector of said control transistor for providing a voltage value to said amplifier other input equal to the product of said sensed current value and said burden resistor value.

32. The circuit interrupter of claim 31 including an integrating capacitor connecting between ground and a common electrical connection with a second A/D circuit and a second pair of current mirror transistors.

33. The circuit interrupter of claim 27 wherein said multiplying circuit comprises pulse width modulation, current mirror scaling or digital multiplication.

34. The circuit interrupter of claim 5 including a two to eight encoder connected with said first or second magnitude comparator and to a means for providing a digital representation of said first or second pre-determined overcurrent values.

35. A trip unit for a static trip circuit interrupter comprising:
a pair of separble contacts connected within an electric circuit;
separation means connected with said separable contacts for separating said contacts to interrupt circuit current through said electric circuit upon receipt of a trip signal;
a first counter providing a first fixed clock pulse;

overcurrent pickup circuit means connecting with a first plurality of input terminals for digitally setting overcurrent pickup values and with an input current signal for outputting a pulse width modulated representation of said input current signal;

a squaring circuit connecting with said overcurrent pickup circuit and said first counter for providing a pulse width modulated representation of a multiple of said input current signal; and a long time and short time delay circuit connecting with said squaring circuit and a second plurality of input terminals for providing pre-determined time delay bands received from said second plurality of input terminals to said pulse width modulated representation of said input current signal and said multiple of said input current signal before providing said trip signal to said separation means.

36. The trip unit of claim 35 wherein said overcurrent pickup circuit comprises A/D conversion means connected with a burden resistor and a resistance network for providing a digital representation of multiples of said burden resistor.

37. The trip unit of claim 36 including an oscillator and a time base circuit for providing a second fixed clock pulse to said A/D conversion means, to a long time pickup circuit and to a short time pickup circuit within said overcurrent pickup circuit.

38. The trip unit of claim 36 including an amplifier coupling said input current signal to said resistance network and said A/D conversion means.

39. The trip unit of claim 35 wherein said long time and short time delay circuit includes a divide by n counter connecting with said squaring circuit and with a short time bands and integration circuit, said short time bands and integration circuit including means for inputting said pre-determined time delays to said pulse width modulated representation of said input current signal and for comparing said pulse width modulated representation of said input current signal to said time delay bands for providing a trip signal output to said separation means when said pulse width modulated representation of said input current signal persists longer than any of said pre-determined time delay bands.

40. The trip unit of claim 39 further including a divide by m counter connecting with said divide by n counter and a long time bands and integration circuit, said long time bands and integration circuit having means for providing pre-determined long time bands and comparing said pulse width modulated representation of said input current signal to said long time bands and providing an output signal when said pulse width modulated representation of said input current signal persists longer than any of said predetermined time delay bands.

41. The trip unit of claim 39 including an OR gate having inputs connected with said long time bands and integration circuit and said short time bands and integration circuit for receiving said output signal and outputting a corresponding trip signal to said circuit interrupter.

42. The trip unit of claim 40 including a target circuit connected in common with said OR gate inputs for providing indication of the occurrence of said output signal from said long time bands and integration and said short time bands and integration circuit.

43. The circuit interrupter of claim 41 further including a second resistance network and a second comparator, the output of said second resistance network connected to one input of said second comparator, the input current signal being connected to the other input of said comparator for providing an instant trip signal to said OR gate when said input current signal exceeds any value ocurring on said comparator other input.

44. The trip unit of claim 42 including a ground fault circuit connected with an input ground fault current and a ground fault scaling circuit for providing multiples of pre-determined ground fault pickup current values to a second A/D conversion means.

45. The trip unit of claim 43 including a squaring circuit connected with said second A/D conversion means and with a divide by Q counter, the output of said divide by Q counter being connected with a ground fault bands integration circuit.

46. The trip unit of claim 43 including means for connecting said ground fault scaling circuit and said second A/D conversion means to an averaging capacitor.

47. The trip unit of claim 44 wherein said ground fault bands and integration circuit includes means for providing ground fault time bands for comparing with the ground fault current signal from said divide by Q counter and for providing an input to said OR Gate and to said target circuit to output a trip signal to said circuit interrupter when said ground fault input current persists longer than any of said ground fault time delays.

48. The trip unit of claim 36 wherein said trip unit comprises a large scale integrated circuit.

* * * * *

UNITED STATES PATENT AND TRADEMARK OFFICE
CERTIFICATE OF CORRECTION

PATENT NO. : 4,589,052

DATED : May 13, 1986

INVENTOR(S) : John J. Dougherty

It is certified that error appears in the above-identified patent and that said Letters Patent is hereby corrected as shown below:

Column 10, line 47, delete "a" (first occurrence)

Column 12, line 23, change "connersion" to --conversion--

Column 12, line 62, change "separble" to --separable--

Signed and Sealed this

Nineteenth Day of August 1986

[SEAL]

Attest:

DONALD J. QUIGG

Attesting Officer

Commissioner of Patents and Trademarks